United States Patent
Hublikar

Patent Number: 5,871,180
Date of Patent: Feb. 16, 1999

[54] INFLATABLE ESCAPE SLIDE

[75] Inventor: Sudhendra Venkatesh Hublikar, Hudson, Ohio

[73] Assignee: The B. F. Goodrich Company, Richfield, Ohio

[21] Appl. No.: 871,246

[22] Filed: Jun. 9, 1997

[51] Int. Cl.⁶ .............................. A62B 1/20; B65G 11/10
[52] U.S. Cl. ..................... 244/137.2; 244/905; 193/25 B
[58] Field of Search ................................ 244/137.2, 905; 182/48; 193/5, 6, 25 B

[56] References Cited

U.S. PATENT DOCUMENTS

| | | | |
|---|---|---|---|
| 3,391,771 | 7/1968 | Day | 193/25 B |
| 3,463,266 | 8/1969 | Day | 182/48 |
| 3,464,515 | 9/1969 | Evans | 193/25 B X |
| 3,606,939 | 9/1971 | Summer et al. | 193/25 B |
| 3,897,861 | 8/1975 | Miller et al. | 193/25 B |
| 3,944,023 | 3/1976 | Fisher | 182/48 |
| 3,973,645 | 8/1976 | Dix et al. | 193/25 B X |
| 4,018,321 | 4/1977 | Fisher | 193/25 B |
| 4,460,062 | 7/1984 | Fisher | 193/25 B X |
| 4,526,262 | 7/1985 | Malcolm | 193/25 B |
| 4,567,977 | 2/1986 | Fisher | 193/25 B |

*Primary Examiner*—William Grant
*Attorney, Agent, or Firm*—Joseph Januszkiewicz

[57] ABSTRACT

An inflatable escape slide that includes a plurality of inflatable tubes that are held in a folded condition and elastic strap members at the site of the fold of the folded tubes that puckers up the material at the fold site to maintain an unobstructed passageway at the fold to provide communication throughout the inflatable tubes.

16 Claims, 5 Drawing Sheets

INFLATABLE ESCAPE SLIDE

BACKGROUND OF THE INVENTION

This invention relates to an inflatable emergency evacuation escape slide used primarily on aircraft, off-shore drilling platforms and the like; and more particularly to a new and improved inflatable escape slide that has a strap means to pucker the material at the folded portion of the slide to insure proper deployment under adverse weather conditions.

In the deployment of escape slides under emergency conditions it is necessary to evacuate the passengers and the crew members as quickly as possible. The invention will be described and generally directed to an aircraft but the invention is equally applicable to other fields of use such as off-shore drilling platforms.

The inflatable escape slide is stored adjacent to an egress or exit door of an aircraft in a deflated condition and when necessary to use, the deflated slide is deployed outwardly from the aircraft. The slide, as it is extended outwardly from the egress door momentarily hangs in a relatively limp condition. In this position the deflated escape slide is highly vulnerable to wind deflection particularly cross winds which can direct it underneath the aircraft to render it useless as an escape slide.

In the deployment process where delayed restraint devices are employed to control the release of the folded portions, it has been found desirable to use back-up supplementary devices of restraints because of sharp or large pressure load changes that are prematurely encountered due to the restrictions imposed during deployment as the slide unfolds. In these instances the inflating pressure can exert an undesirable transient random load as a ram effect on the newly unfolding portion because of the restriction caused by the fold and the forces acting on it including the cross winds. These ram effect loadings can effect premature release of the restraint devices and are counterproductive in their effect and usually result in an unusable escape slide. It must also be borne in mind that external wind forces also compound the loading problem of these restraints and accordingly applicant's invention provides the means to prevent these unusual loadings thereby eliminating ram effect loadings.

The present invention employs a unique extensible member at the fold portion of a slide which insures the unimpeded passage of pressurized air between folded sections particularly at the folds of an escape slide being deployed, eliminating the random ram effects and premature loading of the pressurized air flow.

SUMMARY OF THE INVENTION

An inflatable escape slide for use in emergencies to evacuate personnel, passengers and crew members from an aircraft or an off-shore drilling platform and the like. The escape slide is composed of a plurality of inflatable tubes with a slide surface and is held in a folded condition by a delayed restraint release device. An elastic strap member connects spaced portions of the inflatable tubes to pucker the escape slide material including the inflatable tubes at the site of the fold to provide an unobstructed passageway in the fold area of the inflatable tubes for the flow of pressurized air.

DETAILED DESCRIPTION

Figure 1:
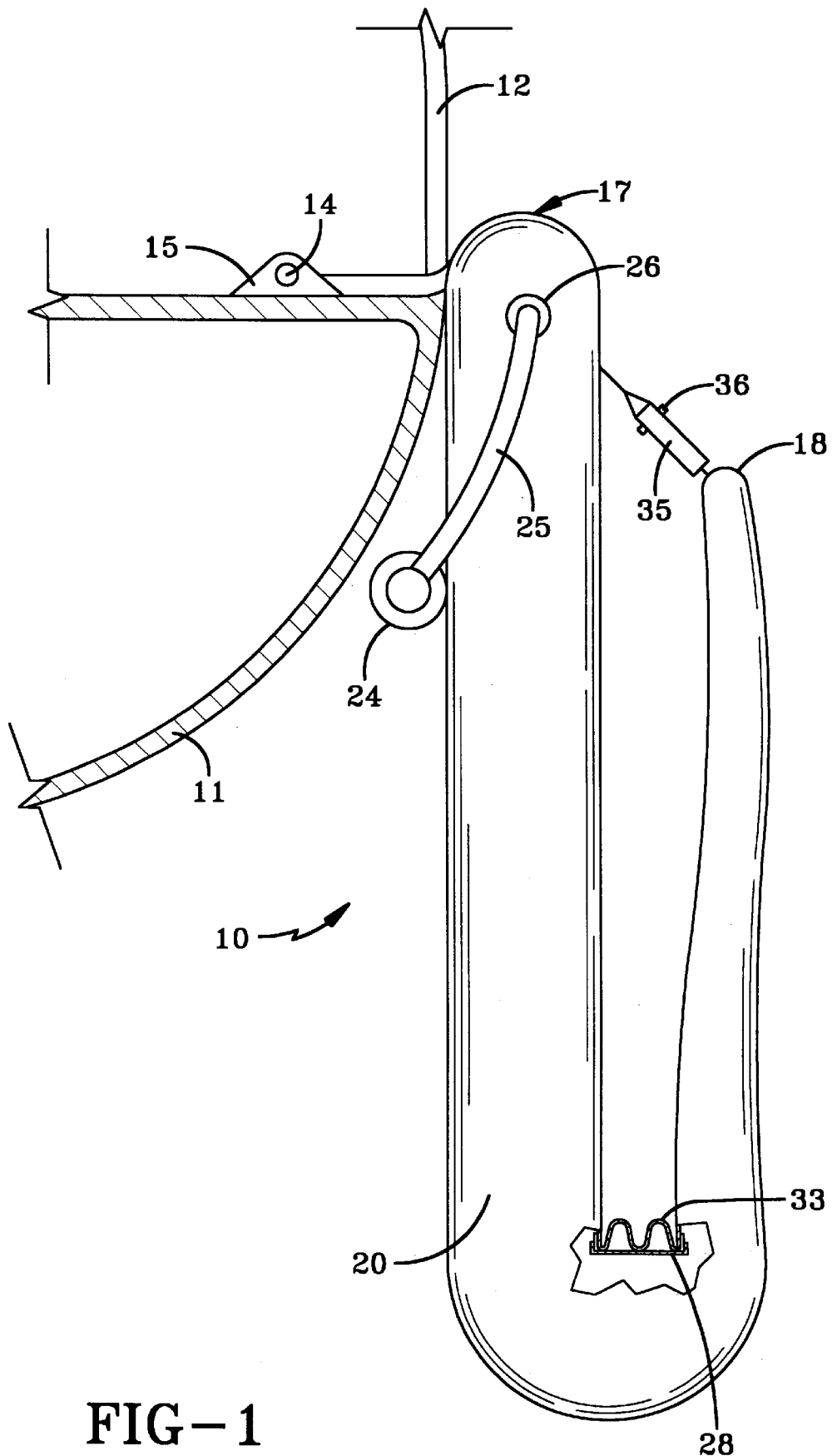
FIG. 1 is a side elevation view of an escape slide deployed from the fuselage of an aircraft, illustrating a portion of such slide inflated and a portion of the inflatable tube of the slide broken away to illustrate an elastic strap mounted on the inside of the inflatable tube.
Figure 2:
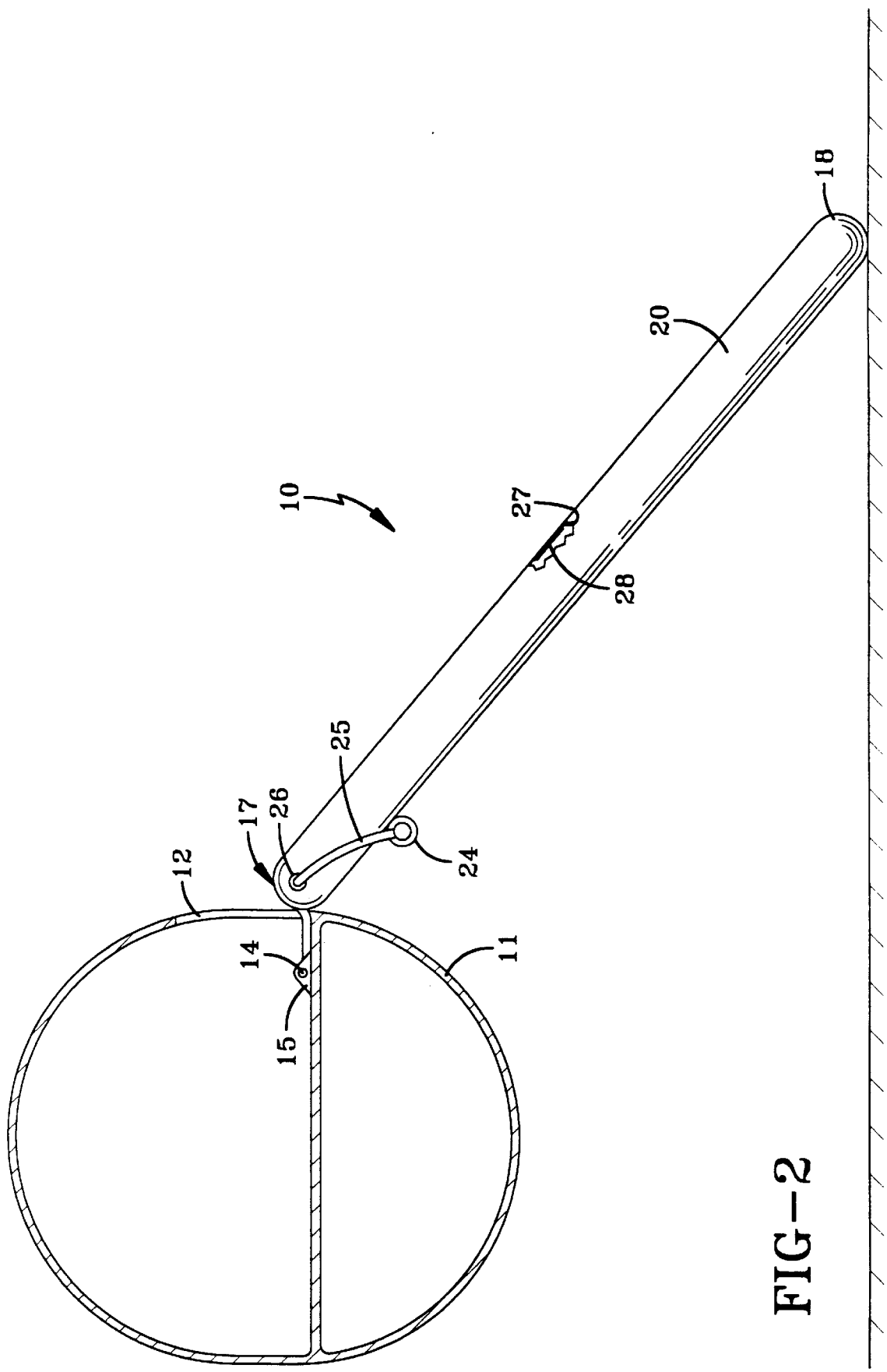
FIG. 2 is a side elevational view of the escape slide fully deployed.
Figure 3B:
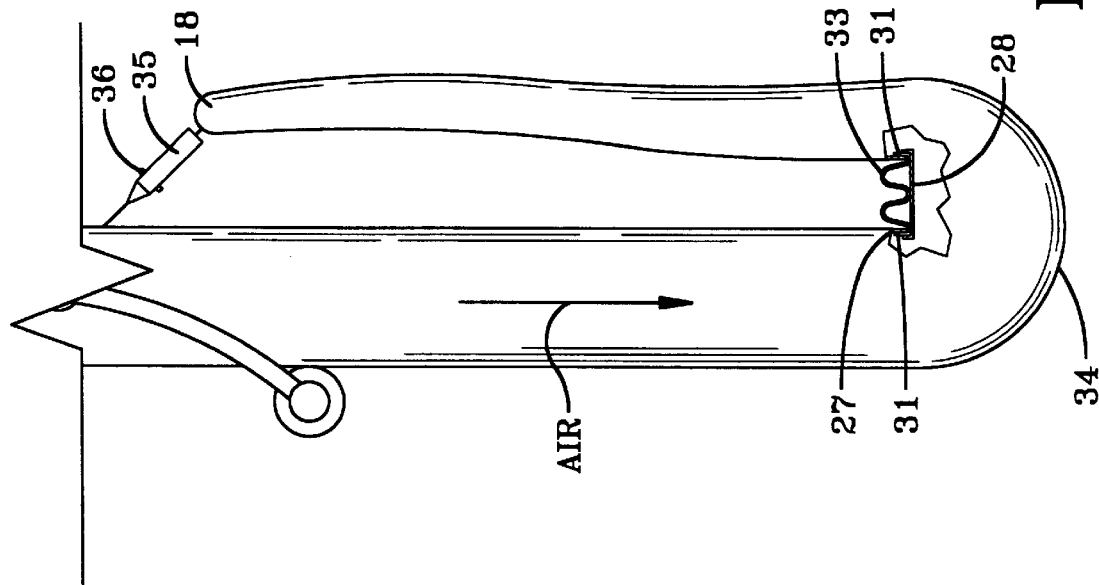
FIG. 3B is a fragmentary side elevational view of the inflatable escape slide with a portion of the inflatable tube broken away adjacent a folded portion to illustrate an elastic strap mounted on the inner surface of the slide which puckers the inflatable tubes outer surface at the fold area.

Referring now to the drawings wherein like reference numerals designate like or corresponding parts throughout the several views, there is shown in FIGS. 1 and 3B an inflatable evacuation escape slide 10 shown in the semi-inflated condition extending from a supporting structure such as an aircraft's fuselage 11. The escape slide 10 is a conventional slide that is deployed through an egress door 12 during a period of on ground emergency to provide for the rapid evacuation of passengers and crew members.

The escape slide 10 is releasably fastened to the fuselage 11 at its upper end adjacent the doorway or egress door 12 by a rod or girt bar 14 which bar is mounted on the fuselage in brackets 15 or by other suitable means fastened to the fuselage 11. A positioning tube may be employed and located between the escape slide and the fuselage 11 to aid in the proper positioning of the slide 10 during deployment but since it forms no part of the invention no further description nor depiction is deemed necessary.

The inflatable escape slide 10 includes a head end 17 and a toe end 18. The entire escape slide 10 is fabricated from a fabric or other suitable material coated with an elastomer. The various inflatable parts are joined together with a suitable adhesive whereby the composite structure will preclude air flow from the various chambers or tubes during operation in the inflated state. The escape slide 10 is of a multi-tubular construction having at least a pair of longitudinally extending tubes or tube members 20 and 21 on the respective sides and suitable inflatable cross tubes to give the escape slide 10 structural stability in the inflated condition. Only two tubes 20 and 21 are shown for simplicity when a greater number of inflatable tubes may be employed. A sheet 23 with a slide surface is suitably fastened to the respective side tubes 20 and 21 as well as the cross tubes in a manner old and well known in the art.

A suitable source of pressurized gas or air, such as a container or bottle of compressed gas 24 is suitably mounted on the underside of the escape slide 10, which bottle is connected via a conduit 25 to an aspirator 26 located on the upper side portion of tube 20. Additional containers of compressed gas, aspirators and hoses or conduits or any combination of them may be used. Suitable valve means on conduit 25 controls the pressurization of the inflatable tubes via a lanyard or automatically by suitable controls.

Figure 4:
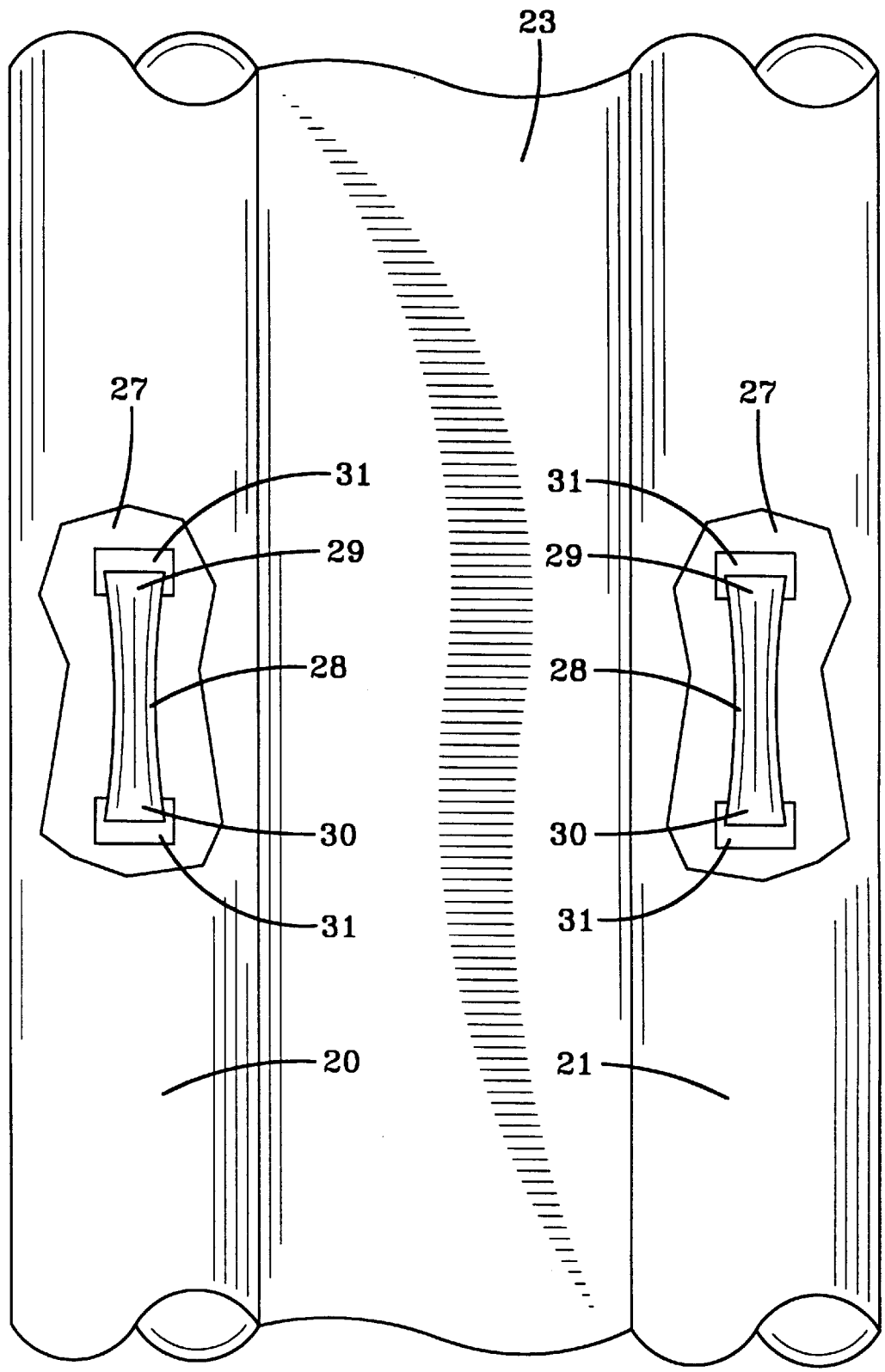
FIG. 4 is a fragmentary view of the underside portion of the escape slide fully deployed with a portion of the longitudinally extending tubes broken away to show the elastic strap interconnecting spaced portions of the inflatable tubes.
Figure 5:
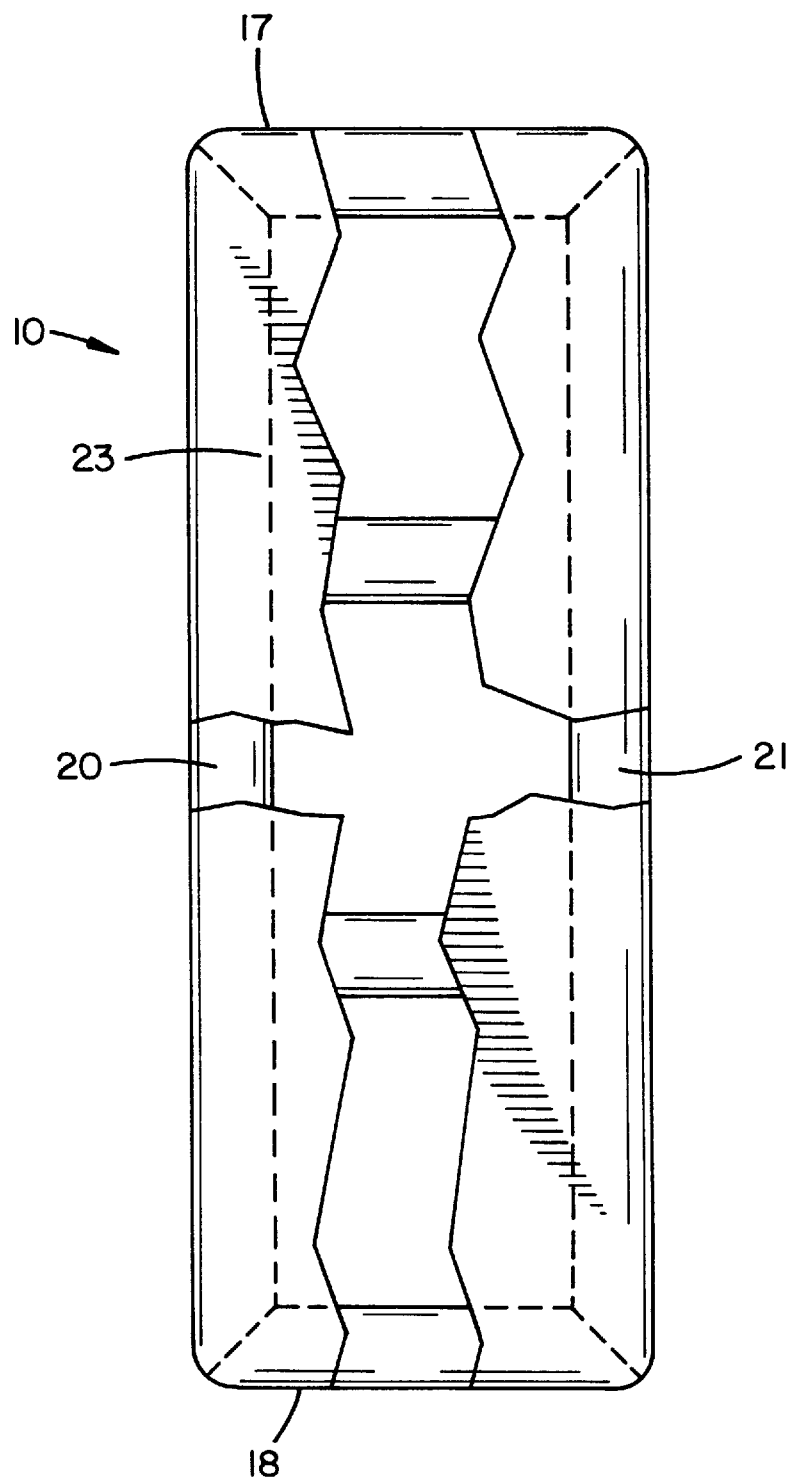
FIG. 5 is a schematic plan view illustrating the overall escape slide with the slide surface sheet broken away to show the tubes or side tubular members and cross tubes.

The escape slide 10 as shown in FIGS. 1 and 3B has a portion of the inflatable tube broken away to disclose an inner surface 27 of the coated fabric material that forms the inflatable side tubes 20 and 21 and the cross tubes. An elastic or extensible strap 28 of suitable width has its respective ends 29 and 30 secured to spaced portions of the inner surface 27 as by pads 31 suitably bonding the ends of such strips or straps 28 to the tube to become integral therewith. the location or points at which the respective ends of the straps 28 are attached to the inner surface 27 of the inflatable tubes is such that the distance between the respective ends 29 and 30 is substantially the same as the fully extended length of the elastic strap 28 as shown in FIG. 4. Release of the tension on the elastic strap 28 will result in the puckering up of the coated fabric material (designated 33 in FIGS. 1 and 3B). The elastic strips or straps 28 in FIG. 3B shows such strap 28 in the relaxed or untensioned condition whereas such elastic strap 28 is shown in FIG. 4 in its tensioned and extended condition when the inflatable tubes 20 and 21 of the escape slide is fully inflated and extended.

FIGS. 1 and 3B show the escape slide 10 in the initial stages of being inflated with the slide fold portion designated at 34 (directly across from the puckered up portion 33). In such folded condition the lower or toe end 18 is folded or doubled back upon itself and is held in this configuration by a delayed restraint release device 35 which secures the toe end 18 to the head end 17. Such release device 35 precludes full extension as by a shear pin 36, breakable upon the attainment of a predetermined pressure in the slide. Such restraint release device 35 may comprise two meeting components coupled by a simple shear pin 36 or shear pins which thus couples the ends of the slide 10. Only when the pressure within the slide reaches a predetermined pressure limit will the shear pin 36 break and release the escape slide to permit its full extension. The release devices may be more complex and reference is made to U.S. Pat. No. 3,944,023, U.S. Pat. No. 4,567,977 and U.S. Pat. No. 3,463,266 and since these restraint release devices are well known in the art and form no part of the invention, no further explanation of them is deemed necessary. Their structures are incorporated herein by reference.

Figure 3A:
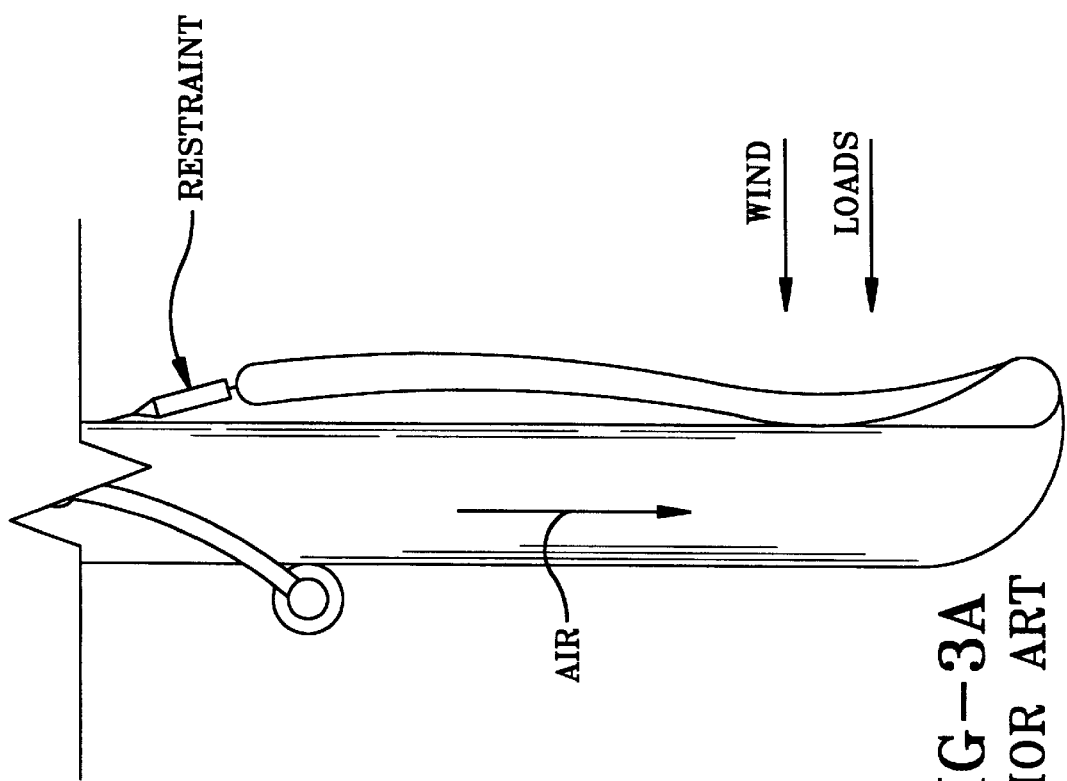
FIG. 3A is a fragmentary side elevational view of a prior art inflatable escape slide partially inflated illustrating the sealing of the inflatable tubes at the fold where there is no elastic strap to pucker up the slide material and tubular members.

As the uninflated escape slide 10 is deployed from the egress door 12 of the aircraft, the toe end 18 of the slide is held firmly at the head end 17 and the initial flow of pressurized air from the bottle 24 of compressed gas begins to distend the upper portion of the slide. The elastic strip 28 holds the material in the crotch portion of the slide, which is the fabric material of the inflatable tubes of the slide, between the attached ends 29 and 30 of the elastic strip of straps 28, into a puckered up condition as at 33, depicted in FIGS. 1 and 3B. This condition assures the maintenance of an unobstructed passage of the pressurized fluid past the folded portion of the slide to insure smooth flow of pressurized air to the next adjoining slide section. There is no sealing of the folded sections (as occurs in prior art depicted by FIG. 3A), thus eliminating ram loading and its disastrous consequences particularly if there is any amount of cross wind blowing which would otherwise tuck the partially inflated slide to swing under the aircraft and thereafter become fully inflated in a useless condition. FIG. 3A depicts the adverse conditions resulting where no elastic strap or strip is located at the fold.

Various modifications are contemplated and may obviously be resorted to by those skilled in the art without departing from the described invention, as hereinafter defined by the appended claims, as only a preferred embodiment thereof has been disclosed.

What is claimed is:

1. In an inflatable evacuation escape slide having a head end and a toe end, said escape slide being folded into a compact unit for deployment, said folded escape slide defines a crotch, inflation means operative upon actuation to provide pressurized fluid to said inflatable escape slide to inflate said slide, an elastic strap means permanently interconnecting spaced portions of said escape slide closely adjacent to said crotch and being operative to pucker up portions of said escape slide at said crotch to provide an unobstructed passage of pressurized air during the inflation of said escape slide.

2. In an inflatable evacuation escape slide as set forth in claim 1 wherein a delayed restraint release device folds and maintains said escape slide in said folded condition.

3. In an inflatable evacuation escape slide as set forth in claim 2 wherein said elastic strap means is an extensible strap means interconnecting said spaced portions of said escape slide when said escape slide is deflated or inflated.

4. In an inflatable evacuation escape slide as set forth in claim 3 wherein said slide includes a pair of longitudinally extending inflatable tube members, and said strap means is a pair of laterally spaced elastic members located on said tube members to create said puckered up portions on each of said tube members of said escape slide.

5. In an inflatable evacuation escape slide as set forth in claim 4 wherein each of said inflatable side tube members has an exterior surface and an interior surface, and said elastic members are located on said interior surface of said tube members adjacent to said crotch.

6. In an inflatable evacuation escape slide as set forth in claim 5 wherein said elastic members are is in a fully extended length when said inflatable escape slide and said tube members are fully inflated.

7. In an inflatable evacuation escape slide for use from an aircraft, said slide having a head end and a toe end, said slide having a plurality of inflatable side tubular members and cross tubular members, a flexible material secured to said tubular members to present a slide surface for the evacuation of passengers and crew members, said escape slide being folded into a compact unit and having at least one fold in each of said side tubular members, each of said folds defines a crotch on the inner portion of said fold when folded, inflation means mounted on said slide and operative upon actuation to provide pressurized fluid to said inflatable tubular members, elastic strap members interconnecting portions of said side tubular members, and said strap members are operative to pucker up portions of said escape slide at said crotch of said fold in each side tubular member to provide an unobstructed passageway in said tubular members at said fold for the passage of pressurized air.

8. In an inflatable evacuation slide as set forth in claim 7 wherein said strap members are located within said tubular members at said crotch of each of said folds.

9. In an inflatable evacuation slide as set forth in claim 8 wherein delayed restraint release means on said escape slide holds said escape slide in a condition providing said fold in each of said side tubular members.

10. In an inflatable evacuation escape slide as set forth in claim 9 wherein said delayed restraint release means interconnects said head end to said toe end.

11. In an inflatable evacuation escape slide as set forth in claim 10 wherein said elastic strap members have spaced end portions that are connected to spaced portions of said tubular members at said crotch of said fold to provide said puckered up portions.

12. An inflatable escape slide for use on an aircraft comprising a plurality of inflatable side tubular members and cross tubular members, a sheet of flexible material secured to said tubular members to provide a slide surface for the evacuation of personnel, inflation means operative upon actuation to provide pressurized fluid to said escape slide, said slide having a head end adjacent to said aircraft and a toe end, delayed restraint release device secured to spaced apart portions of said side tubular members to secure said escape slide into a folded condition which defines a crotch at the fold of each side tubular member, and each of said crotches having an elastic strap member whose opposite ends are secured to spaced portions adjacent to said crotch of said side tubular members creating a puckered portion to each of said tubular members at said crotches.

13. An inflatable escape slide as set forth in claim 12 wherein each of said crotches separates said inflatable side tubular members into a first portion that extends from said head end to said crotch and a second portion that extends from said toe end to said crotch; each of said elastic straps has one of said ends adjacent to said crotch, and each of said elastic straps has the other one of said ends secured to said second portion spaced from said crotch to create said puckered portion.

14. An inflatable escape slide as set forth in claim 13 wherein said elastic strap members are at their full extended length when said side tubular members are fully inflated and said puckered portions in said side tubular members are a smooth continuous surface having eliminated said puckered portions.

15. In an inflatable evacuation escape slide having a head end and a toe end; said escape slide having a pair of inflatable side tubular members and a plurality of inflatable cross tubular members; a flexible material secured to said tubular members to provide a slide surface for the evacuation of passengers; said escape slide being folded into a compact unit and having at least one fold in each of said side tubular members defining folds; each of said folds in said side tubular member having a crotch on the inner adjacent portions of each side tubular member; inflation means mounted on said escape slide and operative upon actuation to inflate said tubular members; each of said side tubular members having an outer exterior surface and an inner interior surface; elastic strap members interconnecting spaced portions of said side tubular members at said crotches; said elastic strap members being operative in a relaxed untensioned and tensioned condition on said side tubular members; and said strap members operative in said untensioned conditions to pucker said inner adjacent portions of said side tubular members at said crotches to provide an unobstructed passageway for the inflation of said side tubular members.

16. In an inflatable evacuation escape slide as set forth in claim 15 wherein said elastic strap members are located on said inner interior surface of said side tubular members.

\* \* \* \* \*